(12) United States Patent
Koelker

(10) Patent No.: US 9,732,829 B1
(45) Date of Patent: Aug. 15, 2017

(54) VARIABLE RATIO TRANSMISSION WITH SPHERICAL TEETH

(71) Applicant: Neil D. Koelker, Xenia, OH (US)

(72) Inventor: Neil D. Koelker, Xenia, OH (US)

( * ) Notice: Subject to any disclaimer, the term of this patent is extended or adjusted under 35 U.S.C. 154(b) by 0 days.

(21) Appl. No.: 15/190,387

(22) Filed: Jun. 23, 2016

(51) Int. Cl.
F16H 25/04 (2006.01)
F16H 3/42 (2006.01)
F16H 37/04 (2006.01)

(52) U.S. Cl.
CPC ............ *F16H 3/423* (2013.01); *F16H 37/04* (2013.01)

(58) Field of Classification Search
CPC .......... F16H 37/04; F16H 25/04; F16H 3/423; F16H 23/06
See application file for complete search history.

(56) References Cited

U.S. PATENT DOCUMENTS

| 4,680,985 | A | 7/1987 | Troester |
| 5,546,822 | A * | 8/1996 | Fowler .................... F16H 25/04 74/113 |
| 5,984,820 | A | 11/1999 | Wedeniwski |
| 6,001,042 | A | 12/1999 | Raney |
| 6,055,880 | A | 5/2000 | Gogovitza |
| 6,910,984 | B1 | 6/2005 | Fragnito |
| 7,051,610 | B2 | 5/2006 | Stoianovici et al. |
| 7,273,433 | B1 | 9/2007 | Troester |
| 2002/0170374 | A1 | 11/2002 | Stewart |
| 2003/0148845 | A1 | 8/2003 | Gonzalez |
| 2006/0252589 | A1 | 11/2006 | Tay |
| 2009/0176616 | A1 | 7/2009 | Sekiya |
| 2015/0204420 | A1 * | 7/2015 | Helmut .................... F16H 3/34 74/397 |

OTHER PUBLICATIONS

YouWheel.com; "Continuously Variable Transmission: A Revolutionary Design"; Editor; Jul. 3, 2014; located at http://blogs.youwheel.com/2014/07/03/continuously-variable-transmission-revolutionary-design/.

* cited by examiner

*Primary Examiner* — Ramya Burgess
*Assistant Examiner* — Lillian Nguyen
(74) *Attorney, Agent, or Firm* — Thomas E. Lees, LLC

(57) ABSTRACT

A variable gear system for various embodiments of continuously variable transmissions comprises a gear including a radius, an axis, and spherical teeth spaced from each other by a constant pitch. The spherical teeth of the gear engage a splined shaft comprising a radius that varies nonlinearly along a length of the splined shaft, an axis running the length of the splined shaft, and splines along the length of the splined shaft. Further, a portion of the length of the shaft across a seam of the splined shaft includes a non-constant pitch between the splines.

17 Claims, 7 Drawing Sheets

VARIABLE RATIO TRANSMISSION WITH SPHERICAL TEETH

BACKGROUND

Various aspects of the present disclosure relate generally to transmission systems and specifically to improvements in the technical field of continuously variable transmissions.

A transmission (e.g., for a bicycle, automobile, generator, etc.) is a machine that controls power supplied by a power source via an input shaft with a gear. The transmission typically includes several differently sized gears that offer different gear ratios for the gear of the input shaft. When the input shaft rotates, the gear of the input shaft engages one of the gears of the transmission, which results in a different rotational speed (i.e., angular velocity) on the engaged gear than on the gear of the input shaft. Further, the lower rotational speed of the engaged gear results in a higher torque output.

In many transmissions, the gears are at discrete ratios. However, in a continuously variable transmission (CVT), the gears include continuous ratios, which can allow for an infinite number of gear ratios between a high ratio and a low ratio. Further, a continuously variable transmission does not require a clutch to transition between the different gears of the continuously variable transmission.

BRIEF SUMMARY

According to aspects of the present invention, a variable gear system for various embodiments of continuously variable transmissions comprises a gear including a radius, an axis, and spherical teeth spaced from each other by a constant pitch. The spherical teeth of the gear engage a splined shaft comprising a radius that varies nonlinearly along a length of the splined shaft, an axis running the length of the splined shaft, and splines along the length of the splined shaft. Further, a portion of the length of the shaft across a seam of the splined shaft includes a non-constant pitch between the splines.

DETAILED DESCRIPTION

According to various aspects of the present disclosure, a variable ratio transmission includes a gear with spherical teeth and a splined shaft that includes a radius that varies nonlinearly along the length of the shaft. The spherical teeth of the gear engage the splines of the shaft along the length of the shaft. As the gear moves along the length of the shaft (or as the shaft moves lengthwise inside the gear), the ratio between the gear radius and the shaft radius changes.

Further, the spherical teeth of the gear are spaced from each other by a constant pitch; however, only portions of the shaft include a constant pitch between the splines the entire way around the shaft. The points along the length of the shaft that include a constant pitch the entire way around the shaft are defined as ideal gears (the pitch between the splines should be similar to the pitch of the teeth of the gear). However, the portions of the shaft may not include a constant pitch between the splines the entire way around (i.e., a non-ideal gear). For example, in places along the length of the shaft that are not ideal gears, the spline pitch across a seam (i.e., where the constant-pitch splines merge from opposite sides of the shaft) may have a pitch that is greater or less than the pitch between the rest of the splines of the shaft at that point of the length.

Moreover, the splines on the shaft are not necessarily straight. For example, some of the splines may curve along the length of the shaft in order to maintain the constant pitch, to ensure correct engagement with the spherical teeth. The spherical nature of the teeth and the curvature of the splines aid in transitioning from a non-ideal gear ratio to an ideal gear ratio by taking advantage of induced axial thrust forces created during transition between ideal gear ratios. Thus, a minimal force is required to start the transition process between ideal gears and the gear change may take place quicker than in a conventional CVT. Moreover, the curved splines may force a gear-ratio change to an adjacent ideal gear before the seam of the shaft is reached. Further, the spherical teeth provide a positive engagement between the gear and the shaft (instead of a frictional engagement of a belt in a conventional CVT). This positive engagement allows for higher torque on the shaft/gear without slippage.

Figure 1:
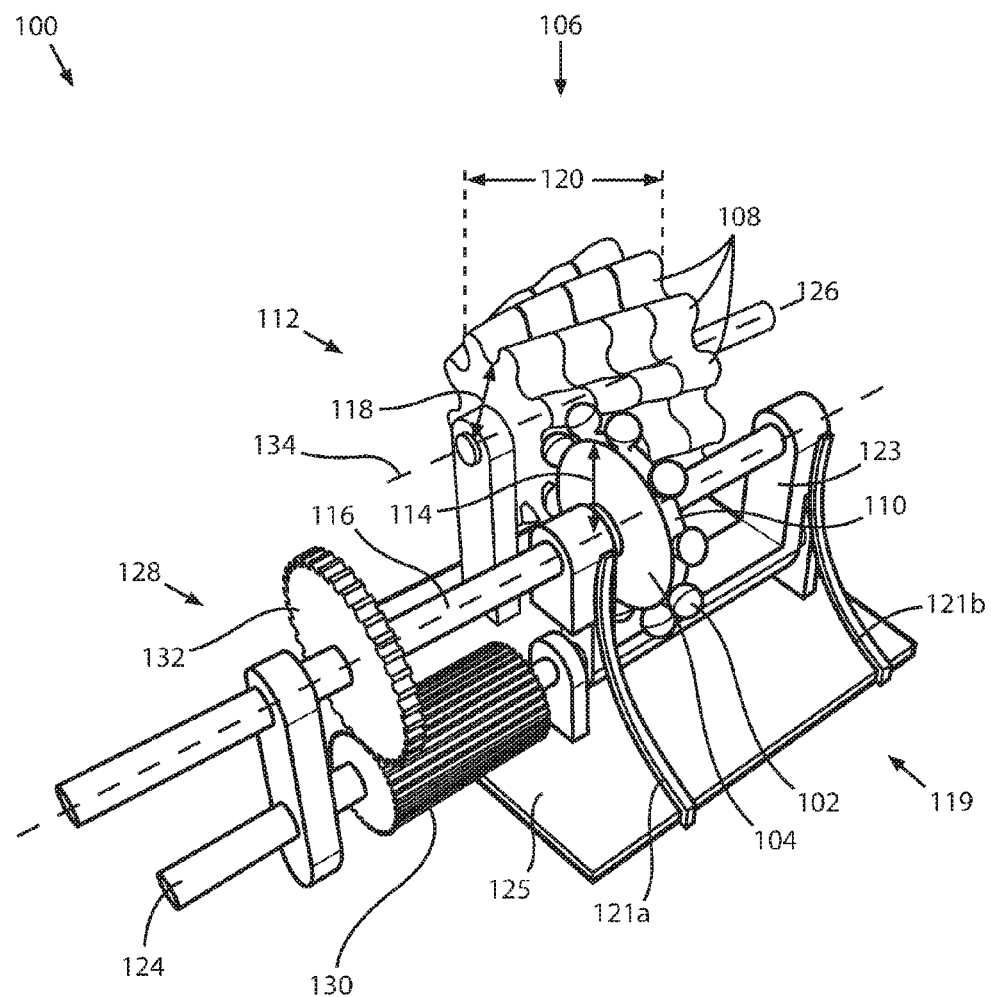
FIG. 1 illustrates a variable ratio transmission with a single splined shaft and a gear with spherical teeth, according to various aspects of the present disclosure.

Referring to drawings and in particular FIG. 1, a variable ratio transmission 100 with spherical teeth 102 is shown. The transmission 100 includes a gear 104 and a shaft 106 with a series of splines 108 (i.e., a splined shaft). As shown, the spherical teeth 102 are on an external surface 110 of the gear 104 and the splined shaft 106 is adjacent to the gear 104. In other words, the gear 104 as shown in FIG. 1 is an externally toothed gear, and the splined shaft 106 is disposed adjacent to the gear 104. The gear 104 and shaft 106 together create a variable gear system 112.

Figure 5:
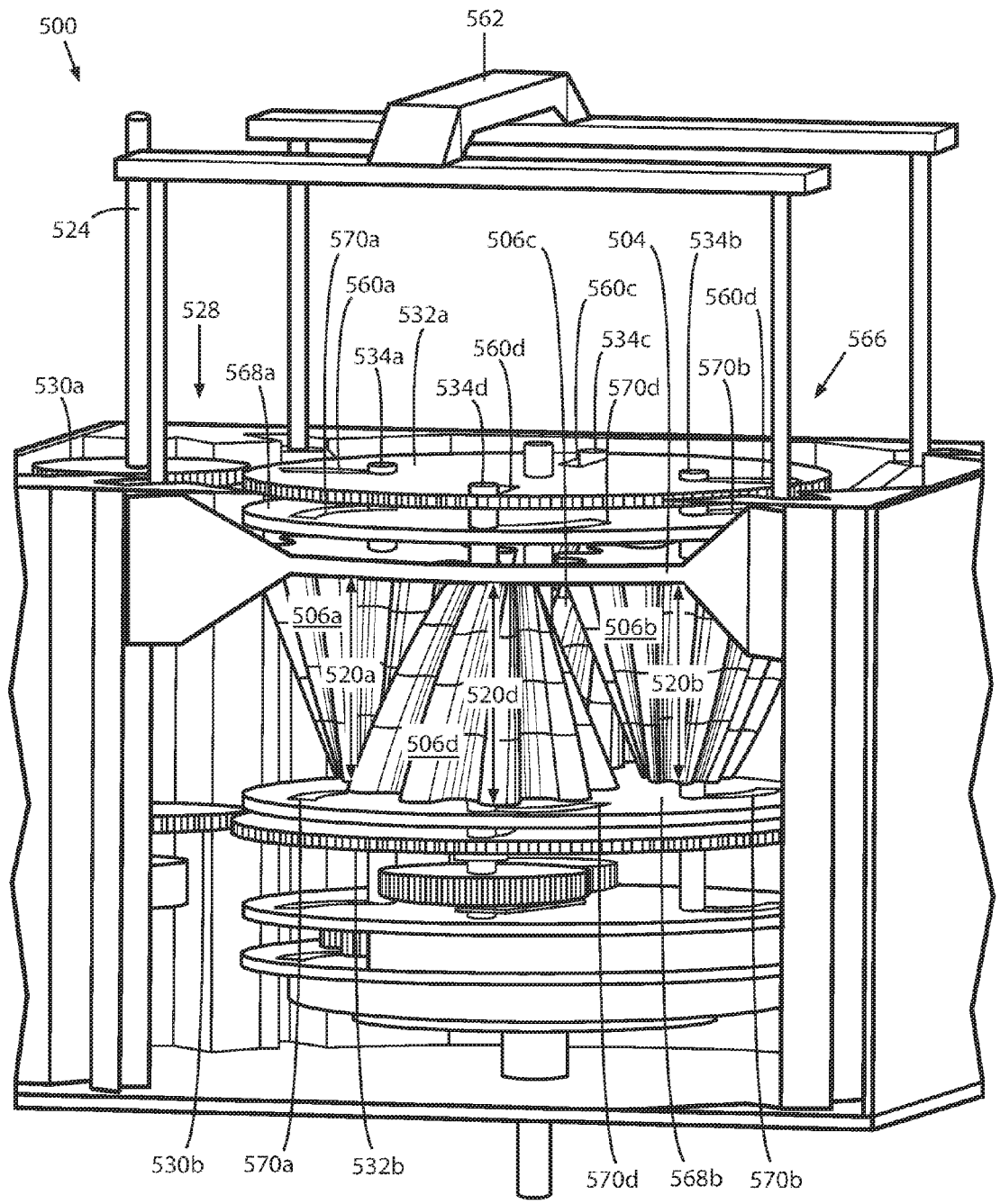
FIG. 5 illustrates a variable ratio transmission with a four splined shafts and an engagement mechanism with guides and an alignment gear, according to various aspects of the present disclosure.

However, other configurations are possible. For example, the spherical teeth 102 may be located internally to the gear 104, and the splines 108 may also be located externally to the splined shaft 106 (as shown in FIG. 5). In this configuration, the splined shaft 106 is located inside of the gear 104. In another configuration, the spherical teeth 102 may be located externally to the gear 104, and the splined shaft may be hollow with splines 108 located internally to the splined shaft 106. In such a configuration, the gear 104 is located internally to the shaft 106.

The gear 104 includes a radius 114 and an axis 116, and the shaft includes a radius 118 that varies non-linearly along a length 120 (e.g., an axis) of the shaft 106. When the spherical teeth 102 contact the splines 108 along the length 120 of the shaft, the ratio of the radius 114 of the gear 104 to the radius 118 of the shaft 106 at the point of contact determines the gear ratio of the transmission 100. As the gear 104 moves up and down the length 120 of the shaft 106, different gear ratios may be obtained because the radius 118 of the shaft 106 varies along the length 120 of the shaft 106.

The varying radius 114 may be linear resulting in a cone or conical frustum or may be non-linear resulting in any three-dimensional shape with a radius (e.g., a stepped conical frustum (as shown in FIG. 1), a partial sphere, etc.). At portions of the length 120 of the shaft 106 where the gear 104 may contact the shaft 106, the radius 118 of the shaft should be continuous (i.e., non-discrete) to provide a continuously variable transmission. However, portions of the length 120 of the shaft 106 that will not contact the gear 104 need not be continuous.

In FIG. 1, the axis of the splined shaft 106 is parallel to the axis of the gear 104. As such, the splined shaft 106 must be kept in contact with the gear 104 via a mechanism 119 that supports the gear 104 and the splined shaft 106 and ensures that the gear 104 and the shaft 106 remain engaged as the gear 104 engages the splined shaft 106 along the length 120 of the splined shaft 106. For example, a spring mechanism (e.g., double spring arms 121*a*, 121*b*) may maintain pressure of gear 104 against splined shaft 106, as gear 104 is moved along the length of shaft 120. In this embodiment of the engagement mechanism 119, a coupler 123 between the axis 116 of the gear 104 and an input shaft 124 in conjunction with the spring arms 121*a-b* allow the gear 104 to maintain contact with the shaft 106 regardless of where the gear 104 interacts with the shaft 106 along the length 120, as described herein. Other engagement mechanisms are discussed below.

Moreover, the transmission 100 includes the input shaft 124 and an output shaft 126, both coupled to the variable gear system 112. Further, the input shaft 124 may be coupled to the splined shaft 106 or the gear 104 directly or indirectly. For example, as shown in FIG. 1, the input shaft 124 is coupled to the axis 116 of the gear 104 indirectly through an intermediate gear system 128. Thus, the rotational speed of the axis 116 of FIG. 1 is based on the rotational speed of the input shaft 124 and the ratio of gears 130, 132 of the intermediate gear system 128. Alternatively, the input shaft 124 may be coupled to the axis 116 of the gear 104 directly (e.g., the axis 116 is the input shaft 124).

The output shaft 126 rotates at a speed based on a speed of the input shaft, the ratio of the gears 130, 132 of the intermediate gear system 128 (if the intermediate gear system 128 is present), and a ratio of the radius of the gear to the radius of the splined shaft 106 where the gear 104 engages the splined shaft 106 along the length 120 of the shaft 106. For example, if the radius 114 of the gear 104 is four times the radius 118 of the splined shaft 106 and the radii of the gears 130, 132 of the intermediate gear system 128 are identical, then the rotational speed of the output shaft 126 will be four times the rotational speed of the input shaft 124.

The output shaft 126 may be coupled to the splined shaft 106 or the gear 104 directly or indirectly. For example, as shown in FIG. 1, the output shaft 126 is coupled to the splined shaft 106 directly such that there is no intermediate gear system. Alternatively, the output shaft 126 may be coupled indirectly to the splined shaft 106 through an intermediate gear system (an example intermediate gear system for the output shaft 126 is described in greater detail with reference to FIGS. 5-6). Thus, the rotational speed of the output shaft 126 of FIG. 1 is based on the rotational speed of the input shaft 124, the ratio of the radius of the gear 104 and the splined shaft 106, and the ratio of gears of the intermediate gear system.

As shown in FIG. 1, the axis 116 of the gear 104 (and thus the gear 104 itself) rotates and may travel parallel to an axis 134 of the splined shaft 106 to engage the splined shaft 106 at different positions along the length 120 of the shaft 106. Further, as the gear 104 travels, the intermediate gear system 128 gear 132 associated with the gear 104 remains engaged with the intermediate gear system 128 gear 130 associated with the input shaft 124, because the intermediate gear system 128 gear 130 associated with the input shaft 124 is as long as the length 120 of the splined shaft 106.

While FIG. 1 illustrates the gear 104 as adjacent to the splined shaft 106 and both the gear 104 and the splined shaft 106 are free to rotate, other configurations are possible as described above. For example, the gear 104 may be an annular gear with the spherical teeth 102 pointing toward the center of the annular gear (i.e., toward the axis), and the splined shaft would be disposed within the annular gear. In such a case, the gear 104 may be fixed such that the gear 104 is incapable of rotating, and the input shaft causes the splined shaft 106 to revolve around the axis of the gear 104. The output shaft is coupled to the splined shaft indirectly through an intermediate gear system.

In an alternate embodiment, the splined shaft 106 may be fixed such that the splined shaft is incapable of rotation, and the input shaft causes the gear 104 to revolve around the axis of the splined shaft. The output shaft is coupled to the gear 104 indirectly through an intermediate gear system.

As shown in FIG. 1, there is a one-to-one ratio between a number of gears 104 and a number of splined shafts 106. However, there is no such requirement. For example, there may be two splined shafts 106 and one gear 104. As a further example, there may be two gears for one splined shaft. As another example, there may be four splined shafts 106 to one gear 104, as discussed in relation to FIGS. 5-6 below.

Figure 2A:
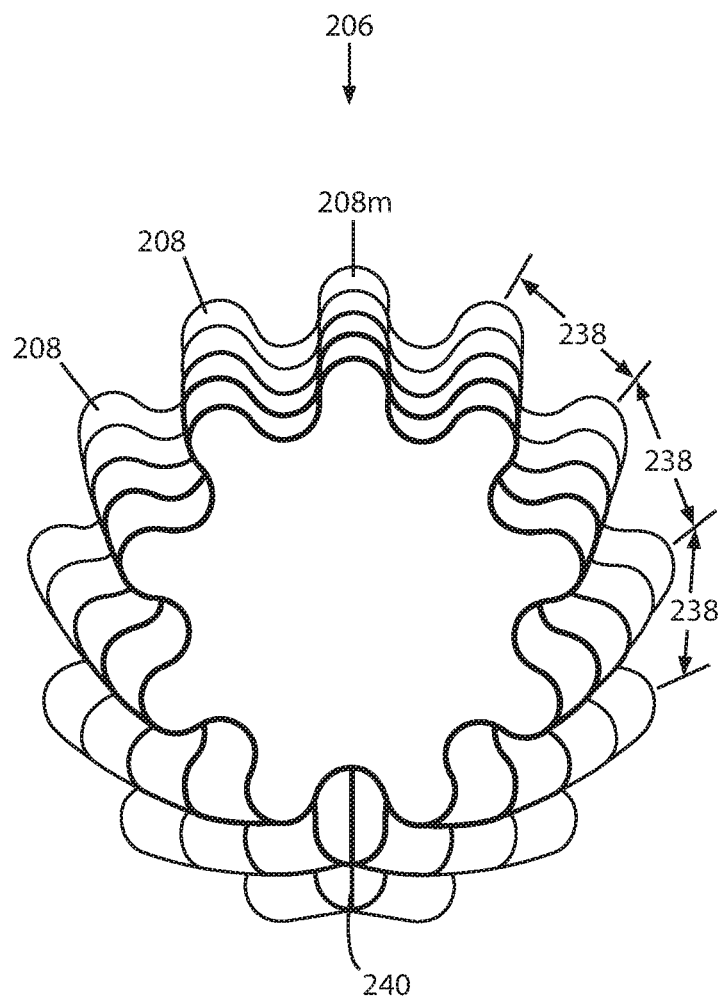
FIGS. 2A-2B illustrate a splined shaft in the shape of a stepped conical frustum, according to various aspects of the present disclosure.
Figure 2B:
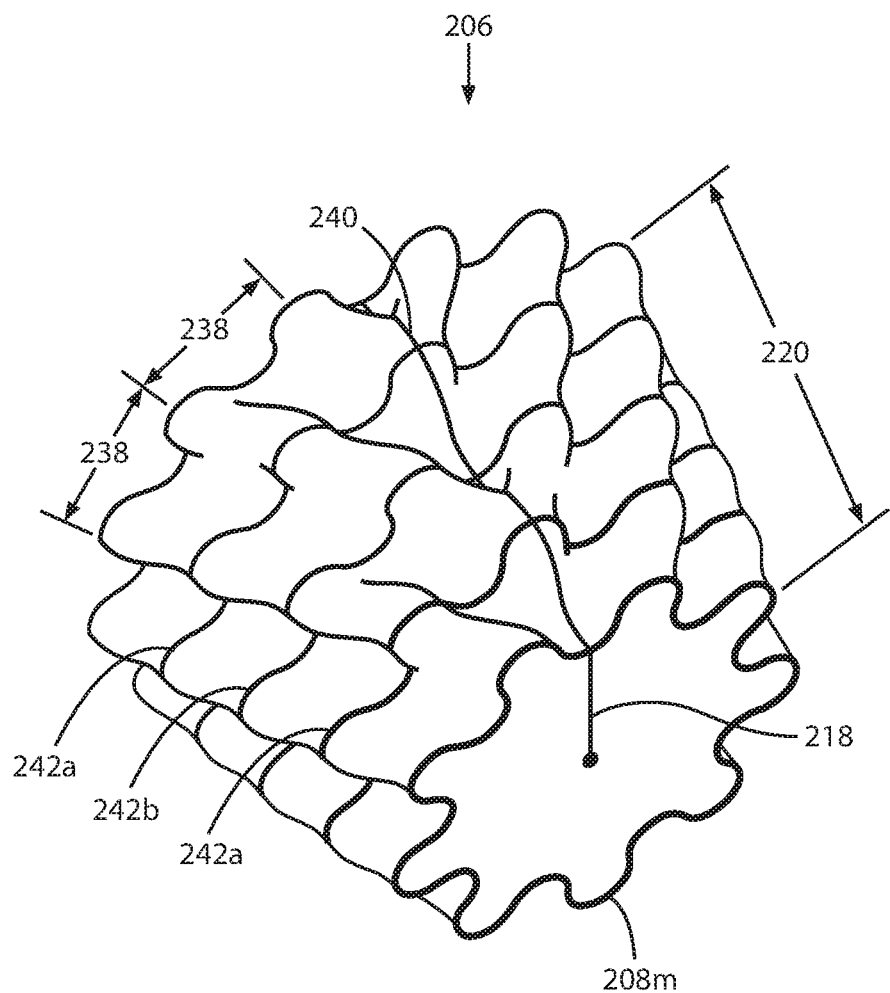

FIGS. 2A and 2B illustrate a fully splined shaft 206 in the shape of a stepped conical frustum, and the radius of the shaft 206 varies non-linearly along the length 220 of the shaft 206. The stepped portions of the stepped conical frustum shaft 206 are at places where there is an ideal gear 242 (i.e., points along the length of the shaft that include a constant pitch the entire way around the shaft).

Specifically, FIG. 2A illustrates a front view of the fully splined shaft 206. The splines 208 are along the shaft 206 such that there is a constant pitch 238 between the splines 208, except across a seam 240 of the shaft 206 at points along the length 220 of the shaft 206 between ideal gears. To account for more splines 208 being added at the seam 240 while maintaining a constant pitch 238 between the splines 208 (except across the seam 240), the splines 208 curve away from the seam 240 at a greater angle the closer the spline 208 is to the seam 240. As shown in FIG. 2A, a main spline 208*m* (i.e., a spline generally opposite of the seam 24) is straight, while the other splines 208 are at least slightly curved. However, there is no requirement that there is a spline opposite of the seam 240. For example, there could be a groove (i.e., a space between two splines) across from the seam 240.

As seen in FIG. 2B, the seam 240 of the shaft 206 introduces more splines 208 along the length 220 of the shaft 206 as the radius 218 of the shaft 206 increases to maintain a constant pitch 238 between the splines 208 elsewhere on the shaft 206. Thus, the distance between the splines 208 on both sides of the seam 240 will be different than the constant pitch 238 at all points along the length 220 of the shaft 206 except where ideal gears 242*a-b* are formed. However, as mentioned above, the spline pitch 238 is constant for ideal gears 242*a-b*. Further, while the variable gear system (100, FIG. 1) is a continuously variable gear system, the variable gear system is engaged at ideal gears 242a-b at most times except when transitioning between ideal gears. For example, the variable gear system 100 of FIG. 1 transitions from an ideal gear to another ideal gear usually before a spherical tooth of the gear (104, FIG. 1) encounters the seam 240. In other words, the gear (104, FIG. 1) can engage the splined shaft 206 at an infinite number of intermediate ratios (i.e., ratios between ideal gear ratios) and will usually transition from an ideal gear to another ideal gear before one complete revolution of the shaft.

Note that ideal gears 242a-b are created under two slightly different conditions. In the first condition, an ideal gear 242a is created when a new spline 208 is added to the splined shaft 206 along the seam 240. Thus, the spline pitch 238 is constant the entire way around the splined shaft 206 at the point along the length 220 resulting in an even number of splines on the shaft of FIGS. 2A-B where there is a main spline 208m opposite the seam (there would be an odd number of splines if there were a groove opposite the seam 240). In the second condition, an ideal gear 242b is created when the space between the splines 208 at the seam 240 is identical to the constant pitch 238. Thus, the spline pitch 238 is constant the entire way around the splined shaft 206 at the point along the length 220 resulting in an odd number of splines 208 on the shaft of FIGS. 2A-B where there is a main spline 208m opposite the seam (there would be an even number of splines if there were a groove opposite the seam 240).

Further, if the slope (i.e., the variation in radius 118, FIG. 1) of the splined shaft 206 is identical for all non-ideal gear portions of the splined shaft 206, then the linear distance along the length 220 between ideal gears 242 gets shorter as the radius gets larger. Therefore, if a constant distance between ideal gears 242 is desired, then the slopes of the splined shaft 206 between ideal gears must not be identical. For example, the distance along the length 120 between ideal gears will increase less as the radius gets larger.

As the gear (104, FIG. 1) transitions from one ideal gear 242a-b of the splined shaft 206 to another ideal gear 242b-a (respectively) of the splined shaft 206, the splines 208 produce non-tangential forces on the gear (104, FIG. 1) to aid in transition. When the gear (104, FIG. 1) transitions engagement from a lower ideal gear ratio 242a (e.g., with ten splines) to a higher ideal gear ratio 242b (e.g., with eleven splines), the splines on one half (from the main spline to the seam) of the splined shaft will aid in transition, and the half that aids in the transition depends on whether the shaft is being rotated clockwise or counterclockwise. For example, looking at the splined shaft of FIG. 2A and a clockwise rotation of the shaft, the left half of the shaft 206 will aid in transitioning the gear.

When the gear (104, FIG. 1) transitions from a higher ideal gear 242a (e.g., with ten splines) to a lower ideal gear 242b (e.g., with nine splines), the splines 208 on the other half of the shaft 206 aid in the transition (again, depending on the direction the shaft 206 is being rotated). For example, looking at the splined shaft of FIG. 2A and a clockwise rotation of the shaft, the right half of the shaft 206 will aid in transitioning the gear.

Figure 3A:
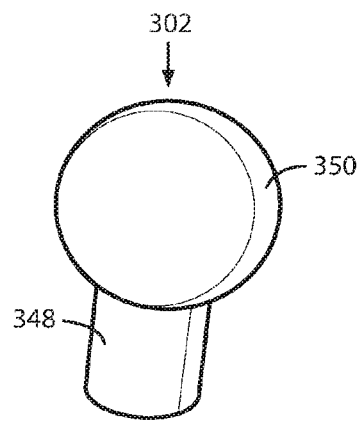
FIGS. 3A-F illustrate different spherical tooth structures of the teeth of FIG. 1, according to various aspects of the present disclosure.
Figure 3B:
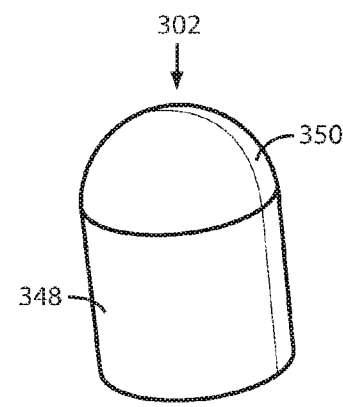

FIGS. 3A-F illustrate different embodiments of the spherical teeth 302 of the gear (104, FIG. 1), where the teeth 302 are at least partially spherical. For example, the teeth should have a spherical surface at all points where engagement contact could be made with the splined shaft, throughout range of operation for a desired embodiment of the variable ratio transmission. For example, as shown in FIG. 3A, the teeth 302 include a support 348 and a partially spherical head 350. The radius of the support 348 is smaller than the radius of the tooth 302, but may be the same size as the radius of the head 350 (resulting in a hemispherical head 350, as shown in FIG. 3B). Any additional portion of a sphere may be used for the head 350 to add strength to the gear or to aid in transitioning between gear ratios, such that the head 350 does not interfere with clearance for proper engagement at all contact points along the length of the of the splined shaft.

Figure 3C:
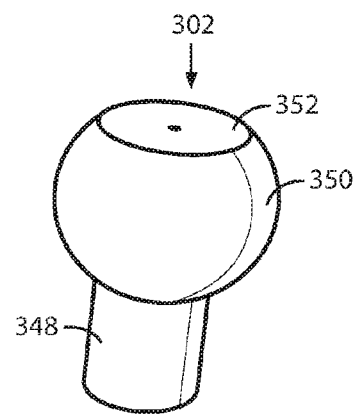
Figure 3D:
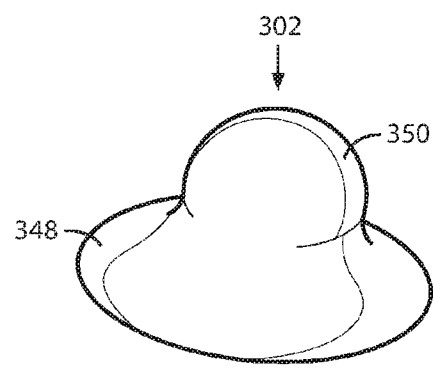
Figure 3E:
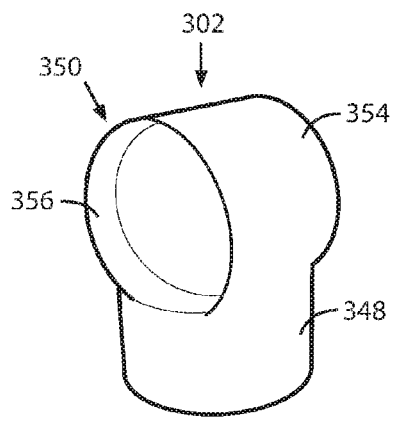
Figure 3F:
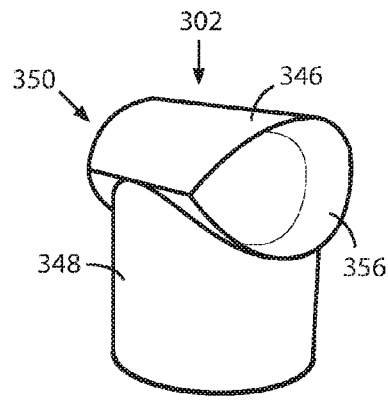

Further, FIG. 3C illustrates a spherical tooth with a flattened surface 352 of the head 350. FIG. 3D illustrates an embodiment of a spherical tooth 302, where the support 348 includes a varying radius. FIG. 3E illustrates a further embodiment of a spherical tooth 302, with a support 348 and a head 350 that includes a cylinder 354 that includes an axis that is generally parallel to the axis (116, FIG. 1) of the gear (104, FIG. 1) and rounded caps 356. Moreover, FIG. 3F illustrates another embodiment of the spherical tooth 302, with a support 348 and a head 350 that includes a lens-shaped (e.g., a vesica piscis, mandoria) prism 346 with rounded caps 356.

The different heads 350 and shafts 348 in the embodiments of FIGS. 3A-F may be combined to form other embodiments. For example, the shaft 348 of FIG. 3D may be used with the head 350 of FIG. 3C to form another embodiment of the spherical tooth 302.

A sphere has an identical circular cross section regardless of angle at which the sphere is bisected. Thus, a gear having spherical teeth may maintain positive engagement with a properly splined shaft while transitioning to different ratios along the length of a splined shaft. Specifically, the spherical teeth make sliding points contact when engaged with a rotating splined shaft, and the collective sum of all possible points of contact, for a given variable gear system, determines what form the spherical teeth may take (more precisely, what portion of the spherical form must be present to make proper contact with the splines). So, any of the teeth in FIGS. 3A-F may be implemented for a given embodiment of a splined shaft as long as the surface of the teeth conform to a sphere at all points where engagement contact is made. Further, there should be clearance enough between adjacent teeth to be able to traverse the most inclined (i.e., sloped) portions of a given embodiment of the shaft.

Figure 4:
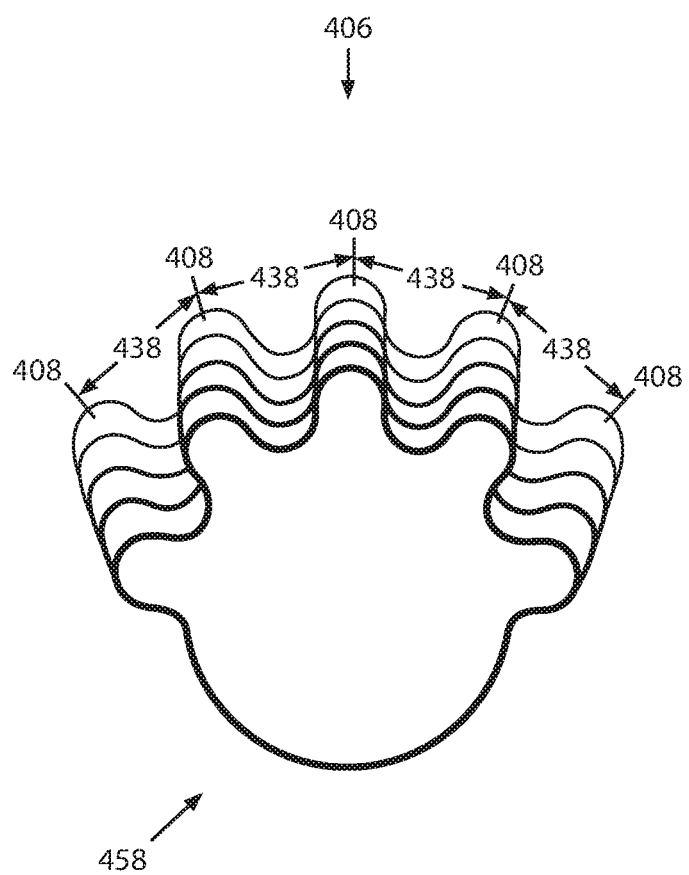
FIG. 4 illustrates a partially splined shaft, according to various aspects of the present disclosure.

FIG. 4 illustrates a partially splined shaft 406. The splined shafts 106, 206 of FIGS. 1, 2A, and 2B illustrate a fully splined shaft, where the splines and grooves are present the entire way around the shaft. For example, a shaft is fully splined if a maximum number of full splines that will fit on a shaft for a given spline pitch at any given point on the shaft are present on the shaft.

On the other hand (turning back to FIG. 4), a partially splined shaft 406 does not include the maximum number of full splines 408 that will fit on the shaft 406 for a given spline pitch 438 at any given point along the length of the shaft 406. As such, there will be a portion 458 of the shaft that does not include a spline (or groove). For example, if only approximately half the number of full splines that will fit on a shaft for a given spline pitch at any given point along the length of the shaft are included then the shaft is partially splined (in this case, half-splined).

The portion 458 of the shaft 406 that lacks the splines 408 should start and stop approximately equidistant from the seam and should include the seam itself. Having the missing splines at the seam minimizes the tangential forces applied to the shaft from the gear (or vice versa, depending on the configuration of the variable gear system), because the closer a spline 408 is to the seam (240, FIG. 2A), the more non-tangential forces are introduced to the gear (which aid in transitioning the gear, but detract from the force spinning the shaft or gear (depending on the configuration of the system)). However, the portion 458 of the shaft 406 that lacks the splines 408 may be along other portions of the shaft (i.e., not near the seam or equidistant from the seam) if so desired.

As mentioned above, there may be a non-one-to-one ratio between the number of splined shafts 406 and gears 104 (FIG. 1). For example, there may be two splined shafts 406 within an annular gear with the spherical teeth on the inside of the annular gear. Thus, there is a two-to-one ratio of splined shafts to gears. In such a case, the splined shafts may be fully splined as shown in FIGS. 1, 2A, and 2B. However, when multiple shafts are used, the shafts may be partially splined. For example, when there are two splined shafts, the shafts may be half splined (i.e., partially splined with half the portion 458 of the shaft 406 that lacks the splines 408 continuously covering approximately half of the splined shaft). As such, at least one spline from one of the two splined shafts is in contact with the gear at any given time.

In another example, the splined shaft may be a stepped biconical frustum (i.e., two stepped conical frusta joined at their bases). In such a configuration, two annular gears may encircle the splined shaft, one annular gear encircling a first conical frustum of the biconical frustum splined shaft, and the other annular gear encircling a second conical frustum of the biconical frustum splined shaft. The biconical frustum splined shaft may be fully splined or partially splined. For example, the biconical frustum splined shaft may be half splined. As such, at least one tooth of one of the gears is in contact with at the biconical frustum splined shaft at any given time.

Figure 6:
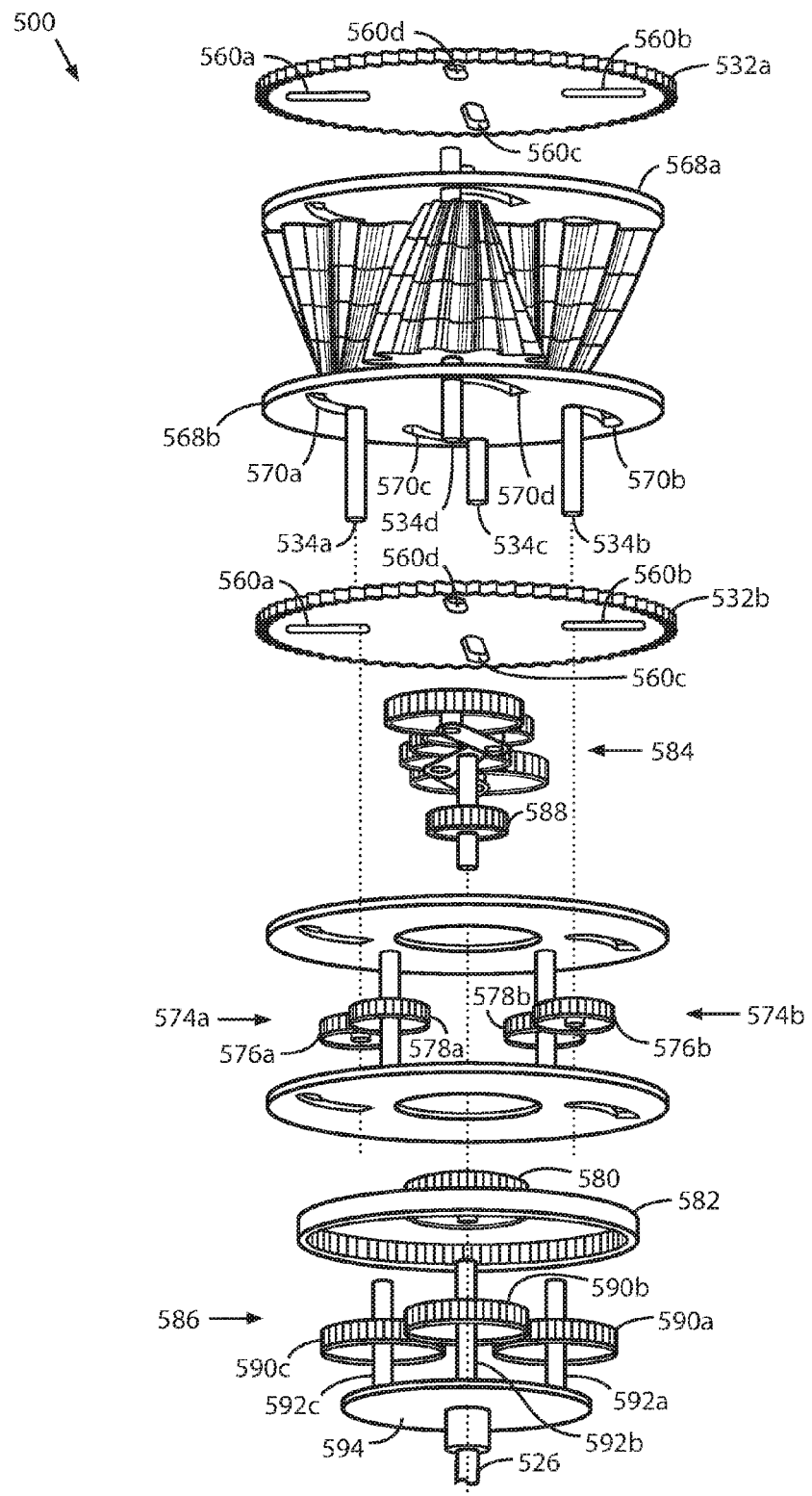
FIG. 6 is an exploded view of portions of the variable ratio transmission of FIG. 5, according to various aspects of the present disclosure.

Another example of a variable ratio transmission 500 is shown in FIGS. 5 and 6. This embodiment of the variable ratio transmission 500 includes an input shaft 524 and an input shaft intermediate gear system 528 including intermediate gears 530a, 530b, 532a, 532b. Intermediate gears 532a and 532b are also referred to as alignment gears 532a, 532b herein, and the alignment gears 532a, 532b each include four slots 560a-d that extend radially. Specifically, each alignment gear 532a-b includes two pairs of slots 560a-d along two perpendicular diameters of the alignment gear 532a-b.

In other words, each alignment gear 532a-b includes a first slot 560a extending outward from an inner point along a diameter of the alignment gear 532a-b to an outer point, a second slot 560b extending outward from an inner point along the same diameter of the alignment gear 532a-b as the first slot to an outer point, a third slot 560c extending outward from an inner point a diameter of the alignment gear 532a-b that is perpendicular to the diameter on which the first slot 560a is disposed to an outer point, and a fourth slot 560d extending outward from an inner point along the same diameter of the alignment gear as the third slot 560c to an outer point.

Four splined shafts 506a-d are disposed between the two alignment gears 532a-b such that the axes 534a-d of the splined shafts 506a-d are within corresponding slots 560a-d of the two alignment gears 532a-b, with two of the splined shafts 506a-b being inverted from the other two splined shafts 506c-d.

When the input shaft 524 rotates, the first intermediate gears 530a-b rotate as well. Because the first intermediate gears 530a-b are meshed with the alignment gears 532a-b respectively, rotation of the first intermediate gears 530a-b causes the alignment gears 532a-b to rotate, which causes the splined shafts 506a-d to revolve around a central point. The system 500 includes two alignment gears 532a-b to reduce torsion forces of the splined shafts 506a-d that may occur (due to inertia) when there is a change in angular velocity of the input shaft 524.

Further, the system 500 includes a fixed gear 504 (in this case, a ring gear with spherical teeth on an internal surface, where the gear does not rotate) that surrounds all four splined shafts 506a-d and makes contact with all four splined shafts 506a-d at the same time. As the splined shafts 506a-d revolve, the spherical teeth, which fit into the grooves (i.e., spaces between splines), cause the individual splined shafts 506a-d to rotate. Note that because two of the splined shafts 506a-b are inverted from the other two splined shafts 506c-d, the two inverted splined shafts 506a-b will have a different gear-to-shaft-radius ratio (except at a certain point along the shafts (depending on a configuration of the splined shafts)) than the other two splined shafts 506c-d. Thus, two inverted splined shafts 506a-b will rotate at a different angular velocity than the other two splined shafts 506c-d for a given input (at all points along the length of the shafts except at a point where the radii are equal on all four splined shafts).

As shown, the gear 504 is coupled to a handle 562 that allows a user to adjust a position of the gear 504 along the length 520 of the splined shafts 506a-d, which changes gear-to-spline-radius ratios where the gear 504 contacts the splined shafts 506a-d. However, any mechanism may be used to adjust the position of the fixed gear 504 along the length 520 of the splined shafts 506a-d (e.g., a lever, an electric motor, a pneumatic cylinder, a hydraulic cylinder, etc.). Moreover, the system 500 includes an engagement mechanism 566 that makes use of the alignment gears 532a-b and includes two guides 568a-b that are concentric with the alignment gears 532a-b. Each of the guides 568a-b includes four curved slots 570a-d, where two of the curved slots 570a-b curve outward from an inner point corresponding to the inner point of two slots 560a-b of the alignment gears 532a-b to an outer point that is on a different diameter than the inner point of the two slots 570a-b of the guides 568a-b. The other two curved slots 570c-d on each of the guides 568a-b curve inward from an outer point corresponding to the outer point of the other two slots 560c-d of the alignment gears 532a-b to an inner point of the guides 568a-b is on a different diameter than the inner point two curved slots 570c-d of the guides 568a-b.

The axes 534a-d of the splined shafts 506a-d fit through corresponding slots. For example, the axis 534a of a splined shaft 506a fits through the curved slots 570a of the two guides 568a-b and the slots 560a of the two alignment gears 532a-b. That way, when the gear 504 transverses from engaging the splined shaft 506a-b at a lower radius to a higher radius, the splined shafts 506a-b are forced inward, which causes the guides 568a-b to rotate relative to the alignment gears 532a-b. The rotation of the guides 568a-b relative to the alignment gears 532a-b forces the other two splined shafts 506c-d to move outward to maintain contact with the spherical teeth (e.g., see FIGS. 3A-F) of the gear 504, and vice versa when the gear 504 travels in the other direction. In some embodiments, springs or other devices (not shown) aid in pushing apart or bringing together opposing splined shafts 506a-d during a gear-ratio change. Even though there are two ends to the curved slots 570a-d, the axes 534a-d of the splined shafts 506a-d may reside anywhere continuously along the curved slots 570a-d.

The axes 534a-b of the inverted splined shafts 506a-b couple to two first gear sets 574a-b, each with a first gear 576a-b and a second gear 578a-b. Further, the axes 534a-b of the inverted splined shafts 506a-b are concentric with the first gears 576a-b such that when the splined shafts 506a-b revolve around the central point, the first gears 576a-b of the first gear sets 574a-b rotate, which cause the second gears 578a-b of the first gear sets to rotate, which act upon a top gear 580 of a ring gear 582. Thus, when the shafts 506a-b move along the curved slots 560a-b, the first gears 576a-b of the first gear sets 574a-b move as well, but the second gears 578a-b remain coupled between the first gears 576a-b and the ring gear 582 regardless of the location of the first gears 576a-b.

Similarly, the axes 534c-d of the splined shafts 506c-d couple to a second gear set 584 concentric with the first gear sets 574a-b such that when the splined shafts 506c-d revolve around the central point, the second gear set 584 rotates.

The gear sets 574a-b and 584 are connected to a planetary gear system 586. Gear set 584 is engaged with and drives a sun gear 588 of the planetary gear set 586. The sun gear 588 drives three planet gears 590a-c, which are also influenced by the ring gear 582 and which act upon the output shaft 526 via three posts 592 coupled to a plate 594 coupled to the output shaft 526, each concentric with a corresponding planet gear 590a-c. Thus, the rotational direction and velocity of the output shaft 526 is determined by the position of the gear 504 and the relative ratios of all shaft and gear radii including splined shafts 506a-d, gear sets 574a-b and 584, as well as the planetary gear system 586. The output shaft 526 may rotate clockwise, counterclockwise, or remain in a geared neutral state given an input in the same continuous direction.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A variable ratio transmission comprising:
a variable gear system comprising:
a gear including:
a radius;
an axis; and
spherical teeth spaced from each other by a constant pitch; and
a splined shaft including a radius that varies nonlinearly along a length of the splined shaft, wherein the splined shaft includes:
an axis running the length of the splined shaft; and
splines along the length of the splined shaft;
wherein a portion of the length of the shaft includes a non-constant pitch between the splines;
a mechanism that:
supports the gear and the splined shaft; and
ensures that the gear remains engaged with the splined shaft as the gear engages the splined shaft along the length of the splined shaft; and
an input shaft coupled to the variable gear system;
an output shaft coupled to the variable gear system, wherein the output shaft rotates at a speed based on a speed of the input shaft and a ratio of the radius of the gear to the radius of the splined shaft where the gear engages the splined shaft along the length of the shaft.

2. The variable ratio transmission of claim 1, wherein the output shaft is coupled directly to the splined shaft of the variable gear system such that the output shaft rotates at a same speed as a rotational speed of the splined shaft.

3. The variable ratio transmission of claim 1, wherein the output shaft is coupled directly to the gear of the variable gear system such that the output shaft rotates at a same speed as a rotational speed of the gear.

4. The variable ratio transmission of claim 1, wherein:
the gear is an internally toothed annular gear;
the splines of the splined shaft are on an external surface of the splined shaft; and
the splined shaft is disposed within the annular gear.

5. The variable ratio transmission of claim 1, wherein:
the gear is an externally toothed gear;
the splines of the splined shaft are on an external surface of the splined shaft; and
the splined shaft is disposed adjacent to the gear.

6. The variable ratio transmission of claim 1, wherein:
the gear is an externally toothed gear;
the splined shaft is hollow including an internal surface;
the splines of the splined shaft are on the internal surface of the splined shaft; and
the gear is disposed within the splined shaft.

7. The variable ratio transmission of claim 1, wherein the axis of the gear is parallel to the axis of the splined shaft.

8. The variable ratio transmission of claim 1, wherein:
the gear is fixed such that the gear is incapable of rotation;
the input shaft causes the splined shaft to revolve around the axis of the gear; and
the output shaft is indirectly coupled to the splined shaft through an intermediate gear system.

9. The variable ratio transmission of claim 1, wherein:
the splined shaft is fixed such that the splined shaft is incapable of rotation;
the input shaft causes the gear to revolve around the axis of the splined shaft; and
the output shaft is indirectly coupled to the gear through an intermediate gear system.

10. The variable ratio transmission of claim 1, wherein:
the variable gear system further comprises:
a second splined shaft including a radius that varies nonlinearly along a length of the second splined shaft, wherein the second splined shaft includes:
an axis running the length of the second splined shaft; and
splines along the length of the second splined shaft;

wherein a portion of the length of the second splined shaft includes a non-constant pitch between the splines;

the mechanism:
further supports the second splined shaft; and
ensures that the gear remains engaged with at least one of the splined shaft and the second splined shaft.

11. The variable ratio transmission of claim 10, wherein:
the splined shaft is fully splined; and
the second splined shaft is fully splined.

12. The variable ratio transmission of claim 10, wherein:
the splined shaft is partially splined; and
the second splined shaft is partially splined.

13. The variable ratio transmission of claim 1, wherein the splined shaft is a stepped conical frustum shaft including steps.

14. The variable ratio transmission of claim 13, wherein the steps of the stepped conical frustum shaft are along the length of the splined shaft at portions including a constant pitch between the splines.

15. The variable ratio transmission of claim 1, wherein the annular gear traverses the length of splined shaft to change ratios between the radius of the gear and the radius of the splined shaft.

16. The variable ratio transmission of claim 1, wherein the length of the splined shaft traverses the annular gear to change ratios between the radius of the gear and the radius of the splined shaft.

17. A variable gear system comprising:
a gear including:
a radius;
an axis; and
spherical teeth spaced from each other by a constant pitch; and
a splined shaft including a radius that varies nonlinearly along a length of the splined shaft, wherein the splined shaft includes:
an axis running the length of the splined shaft; and
splines along the length of the splined shaft;
wherein a portion of the length of the shaft includes a non-constant pitch between the splines;
wherein the spherical teeth of the gear engage the splines of the splined shaft.

* * * * *